United States Patent
Ning et al.

(10) Patent No.: US 11,972,219 B2
(45) Date of Patent: Apr. 30, 2024

(54) INTENT RECOGNITION OPTIMIZATION PROCESSING METHOD, APPARATUS, AND STORAGE MEDIUM

(71) Applicants: Beijing Baidu Netcom Science Technology Co., Ltd., Beijing (CN); BAIDU USA LLC, Sunnyvale, CA (US)

(72) Inventors: Zeyu Ning, Beijing (CN); Xuchen Yao, Beijing (CN); Wenhao Fang, Beijing (CN); Bo Fu, Beijing (CN); Liqin Feng, Beijing (CN); Xiaomei Chu, Beijing (CN)

(73) Assignees: Beijing Baidu Netcom Science Technology Co., Ltd., Beijing (CN); BAIDU USA LLC, Sunnyvale, CA (US)

( * ) Notice: Subject to any disclaimer, the term of this patent is extended or adjusted under 35 U.S.C. 154(b) by 326 days.

(21) Appl. No.: 17/138,042

(22) Filed: Dec. 30, 2020

(65) Prior Publication Data
US 2021/0365639 A1    Nov. 25, 2021

(30) Foreign Application Priority Data
May 20, 2020    (CN) .......................... 202010432368.0

(51) Int. Cl.
*G06F 40/35* (2020.01)
*G06N 20/00* (2019.01)

(52) U.S. Cl.
CPC ............. *G06F 40/35* (2020.01); *G06N 20/00* (2019.01)

(58) Field of Classification Search
CPC ..... G06F 40/35; G06F 16/3329; G06N 20/00; G10L 15/1822; G10L 15/075; G10L 15/18; G10L 15/22; G10L 13/00
See application file for complete search history.

(56) References Cited

U.S. PATENT DOCUMENTS 10,453,117 B1 * 10/2019 Reavely ................. G06N 5/027
10,600,406 B1 *  3/2020 Shapiro .................. G10L 15/22
(Continued)

FOREIGN PATENT DOCUMENTS

| CN | 108897869 A |   | 11/2018 |            |
|----|-------------|---|---------|------------|
| CN | 108897869 A | * | 11/2018 | G06F 17/30 |

(Continued)

OTHER PUBLICATIONS

First Office Action of corresponding Japanese patent application No. 2020-212529 dated Sep. 21, 2021, five pages.
(Continued)

*Primary Examiner* — Richemond Dorvil
*Assistant Examiner* — Nadira Sultana
(74) *Attorney, Agent, or Firm* — Harness, Dickey & Pierce, P.L.C.

(57) ABSTRACT

This application discloses an intent recognition optimization processing method, apparatus, device and storage medium, and relates to the field of internet technology. The implementation scheme of specific method includes: acquiring a first intent set and at least one original corpus; acquiring a first recognition result of each original corpus, where the first recognition result of any one of the original corpus includes a first intent corresponding to the original corpus recognized by the intent recognition model; acquiring a second recognition result of each original corpus, where the second recognition result of any one of the original corpus includes a second intent corresponding to the original corpus obtained through artificial recognition; and performing optimization processing on the first intent set to obtain a second intent set according to the first recognition result and the second recognition result of each original corpus.

14 Claims, 5 Drawing Sheets

(56) References Cited

U.S. PATENT DOCUMENTS

| | | | |
|---|---|---|---|
| 10,803,867 B2 | 10/2020 | Kato et al. | |
| 11,238,855 B1* | 2/2022 | Goetz | G10L 13/00 |
| 11,507,854 B2* | 11/2022 | Liang | G06N 5/022 |
| 2019/0266237 A1* | 8/2019 | Ray | G10L 15/075 |
| 2019/0377793 A1* | 12/2019 | Li | G06F 40/242 |
| 2020/0035244 A1 | 1/2020 | Kim | |
| 2020/0151253 A1 | 5/2020 | Wohlwend et al. | |
| 2020/0380077 A1* | 12/2020 | Ge | G10L 15/18 |
| 2021/0104236 A1* | 4/2021 | Doggett | G10L 15/22 |

FOREIGN PATENT DOCUMENTS

| | | | | |
|---|---|---|---|---|
| CN | 109376361 A | * | 2/2019 | G06F 40/279 |
| CN | 109871446 A | | 6/2019 | |
| CN | 110162775 A | | 8/2019 | |
| CN | 110427467 A | * | 11/2019 | G06F 16/3329 |
| CN | 110503143 A | | 11/2019 | |
| CN | 111178055 A | | 5/2020 | |
| JP | 2011215742 A | | 10/2011 | |
| JP | 2019070957 A | | 5/2019 | |
| JP | 2019101291 A | | 6/2019 | |
| KR | 20190101328 A | | 8/2019 | |
| WO | WO-2019242483 A1 | * | 12/2019 | G06K 9/6256 |
| WO | WO-2020056621 A1 | * | 3/2020 | G06F 40/284 |

OTHER PUBLICATIONS

Extended European Search Report for corresponding European patent application No. 21170101.6 dated Sep. 30, 2021, nine pages.
Office Action in corresponding Chinese Patent Application No. 202010432368.0 dated Feb. 21, 2023.
Li et al.; "Estimating Driver's Lane-Change Intent Considering Driving Style and Contextual Traffic", IEEE Transactions on Intelligent Transportation Systems, vol. 20, No. 9, Sep. 2019.
Zhan et al.; "SEMBeF : Sensitive and Efficient Malware Behavior Detection Framework based on Sliced Recurrent Neural Network", Journal of Cyber Security, vol. 4, No. 6, Nov. 2019.
Notice of Reasons for Refusal issued in correspondending Japanese Patent Application No. 2020-212529, dated Sep. 14, 2021.
Notice of registration procedure mailed Jun. 25, 2023, in corresponding Chinese Application No. 202010432368.0 (with English translation).
Varghese, et al.; Bidirectional LSTM joint model for intent classification and named entity recognition in natural language understanding; International Journal of Hybrid Intelligent Systems, vol. 13, No. 3; published Dec. 31, 2019.
Wu, et al.; Identification of Query Intents via Combining Multiple Features; PR & AI, vol. 25, No. 3; published Jun. 2012 (with English abstract).
Yang, et al.; Questions Intent Classification Based on Dual Channel Convolutional Neural Network; Journal of Chinese Information Processing, vol. 33, No. 5; published May 15, 2019 (with English abstract).

* cited by examiner

| instance | First Intent Set | | Third Intent Set | |
|---|---|---|---|---|
| | Predictive Intent | Objective Intent | Predictive Intent | Objective Intent |
| 1 | A | A | D | D |
| 2 | A | B | D | D |
| 3 | A | C | D | C |
| 4 | A | B | D | D |
| 5 | A | C | D | C |
| 6 | A | B | D | D |
| 7 | B | B | D | D |
| 8 | B | A | D | D |
| 9 | B | C | D | C |
| 10 | B | A | D | D |
| 11 | B | B | D | D |
| 12 | B | A | D | D |
| 13 | B | B | D | D |
| 14 | C | C | C | C |
| 15 | C | B | C | D |
| 16 | C | A | C | D |
| 17 | C | A | C | D |
| 18 | C | C | C | C |
| 19 | C | C | C | C |
| 20 | C | C | C | C |

INTENT RECOGNITION OPTIMIZATION PROCESSING METHOD, APPARATUS, AND STORAGE MEDIUM

CROSS-REFERENCE TO RELATED APPLICATION

This application claims priority to Chinese Patent Application No. 202010432368.0, filed on May 20, 2020, which is hereby incorporated by reference in its entirety.

TECHNICAL FIELD

The present application relates to the field of internet technologies and, in particular, to an intent recognition optimization processing method, an apparatus, and a storage medium.

BACKGROUND

With rapid development of internet technologies, the automatic question and answering service has been widely promoted and applied, where intent recognition of the acquired corpus is one of the important contents thereof. In the process of intent recognition of the corpus, it is necessary to determine and provide an intent set in advance, so that an intent recognition model or an artificial tagger can select intents from the intent set for corpus tagging.

In the prior art, after obtaining the intent set by learning the sample data, the fixed intent set obtained by learning is used for selecting the intent therein by the intent recognition model or the artificial tagger to perform the corpus tagging.

However, when the classification granularity of the intent set obtained by learning is too fine or too vague, the recognition efficiency and the accuracy rate of the corpus intent recognition would be significantly affected, which in turn affects the rate and the accuracy of the corpus tagging.

SUMMARY

Embodiments of the present application provide an intent recognition optimization processing method, an apparatus, and a storage medium, which are used to solve the problem of low intent recognition efficiency and unguaranteed accuracy caused by too fine or too vague intent classification.

In a first aspect of the present application, an intent recognition optimization processing method is provided, including:

acquiring a first intent set and at least one original corpus;

acquiring a first recognition result of each original corpus, where the first recognition result of any one of the original corpus includes a first intent corresponding to the original corpus recognized by an intent recognition model;

acquiring a second recognition result of each original corpus, where the second recognition result of any one of the original corpus includes a second intent corresponding to the original corpus obtained through artificial recognition; and performing optimization processing on the first intent set, according to the first recognition result and the second recognition result of each original corpus, to obtain a second intent set.

The optimization of the first intent set is achieved according to the model recognition result and artificial tagging result of each original corpus, i.e. according to the predictive intent and objective intent of each original corpus. The practicality of the optimization manner of the intent set is high and the optimization reference factors are diversity, and the recognition efficiency and the recognition accuracy of the intent recognition model can be significantly improved when performing intent recognition using the second intent set obtained through the optimization.

Further, the performing optimization processing on the first intent set, according to the first recognition result and the second recognition result of each original corpus, to obtain a second intent set, includes:

determining, according to the first recognition result and the second recognition result of each original corpus, a first corpus number and a second corpus number corresponding to each intent in the first intent set; and performing optimization processing on the first intent set, according to the first corpus number and the second corpus number corresponding to each intent in the first intent set, to obtain a second intent set; and where the determining a first corpus number and a second corpus number of corresponding to each intent in the first intent set, includes performing following steps for each intent in the first intent set:

determining, according to the first recognition result of each of the original corpus, the number of original corpus that the first intent thereof is the one of the first intent set as the first corpus number; and determining, according to the second recognition result of each of the original corpus that the first intent thereof is the one of the first intent set, the number of original corpus that the second intent thereof is the one of the first intent set as the second corpus number.

By means of performing optimization processing on the first intent set according to the first corpus number and the second corpus number corresponding to each intent in the first intent set, i.e. according to the number of original corpus corresponding to each intent in the first intent set that the predictive intent of the original corpus is the one of the first intent set, and the number of original corpus corresponding to each intent in the first intent set that both the objective intent and the predictive intent are the one of the first intent set, where the optimization reference factors are diversified and the optimization effect is good.

Further, the performing optimization processing on the first intent set, according to the first corpus number and the second corpus number corresponding to each intent in the first intent set, to obtain a second intent set, includes:

determining a first accuracy rate of the first intent set, according to the first corpus number and the second corpus number corresponding to each intent in the first intent set;

repeating following steps, until whether every two intents in the first intent set need to be merged is determined: determining, according to the first corpus number and the second corpus number corresponding to any two intents in the first intent set, a second accuracy rate corresponding to a third intent set obtained by merging the two intents, and determining that the two intents need to be merged when the second accuracy rate is higher than the first accuracy rate; and merging any two intents that need to be merged in the first intent set, to obtain the second intent set.

Determining whether any two intents need to be merged according to the accuracy rates of the first intent set before and after merging the two intents in a first intent set, and thus a second intent set with higher-precision can be obtained by simplifying the number of intents and classification of intents in the first intent set, which can effectively improve the recognition efficiency and recognition accuracy of intent recognition, and is conducive to achieving more efficient and intelligent automation service.

Further, the first accuracy rate is the ratio of a sum of the second corpus number corresponding to all intents in the first intent set to a sum of the first corpus number corresponding to all intents in the first intent set; and the second accuracy rate is the ratio of a sum of the second corpus number corresponding to all intents in the third intent set to a sum of the first corpus number corresponding to all intents in the third intent set.

Determining whether this any two intents need to be merged according to the accuracy rates of the intent sets before and after merging any two intents in the first intent set, can benefits the optimization of the intent set, and thus the technical effect of dual improvements of intent recognition efficiency and recognition accuracy can be achieved.

Further, the acquiring the second recognition result of each original corpus includes:

determining a tagging value of each original corpus according to the first recognition result of each original corpus, and determining an original corpus that the tagging value thereof exceeds a set threshold as a valuable corpus, to obtain at least one valuable corpus; and acquiring the second recognition result of each valuable corpus.

Determining the valuable corpus according to the first recognition result of each original corpus, and acquiring the artificial recognition result of each valuable corpus, are beneficial to reduce the workload of the artificial corpus tagging, and the optimization efficiency of intent recognition optimization can be effectively improved without compromising the optimization effect.

Further, the first recognition result of each original corpus further includes an intent confidence of each intent in the first intent set corresponding to the original corpus; and the determining, according to the first recognition result of each original corpus, a tagging value of each original corpus, includes:

determining, according to an intent confidence of each intent in the first intent set corresponding to the original corpus, a confidence information entropy, a highest intent confidence and a secondary highest intent confidence corresponding to each of the original corpus; and determining, according to the confidence information entropy, the highest intent confidence and the secondary highest intent confidence corresponding to each of the original corpus, a tagging value of each of the original corpus.

By means of determining the valuable corpus according to the intent confidence of each intent in the first intent set corresponding to the original corpus, the determined valuable corpus can represent all the original corpus, and thus the optimization effect is good and the optimization efficiency is high by using the valuable corpus to optimize the intent set.

Further, the acquiring the second recognition result of each original corpus includes:

determining that the second recognition result of an original corpus is the same tagging result as the first recognition result, if the second recognition result of the original corpus is not acquired.

When a modeling recognition result of an original corpus is approved by the artificial tagger, the original corpus can be skipped without tagging and the artificial recognition result of the original corpus is determined to be the same as the model recognition result, which is beneficial reduce the workload of artificial taggers and improve the efficiency of the intent set optimization.

Further, the method further includes: selecting an intent from the second intent set to perform corpus tagging using the intent recognition model after the second intent set is obtained.

Performing corpus intent recognition using the second intent set during the daily work of the intent recognition model after the optimized second intent set is obtained, is beneficial to improve the accuracy and recognition efficiency of corpus intent recognition.

Further, the method further includes: training the intent recognition model according to the second recognition result of each original corpus.

Retraining the intent recognition model to achieve the optimization work of the intent recognition model by using artificial recognition result of each original corpus, i.e. according to objective intent of each original corpus, is beneficial to improve the recognition precision and recognition efficiency of the corpus intent recognition and to improve service effect of the automatic question and answering service.

In a second aspect of the present application, an intent recognition optimization processing apparatus is provided, including: at least one processor; and a memory communicatively connected with the at least one processor, wherein: the memory stores thereon instructions executable by the at least one processor, and the instructions are executed by the at least one processor to cause the at least one processor to implement following steps:

acquiring a first intent set and at least one original corpus;

acquiring a first recognition result of each original corpus, where the first recognition result of any one of the original corpus includes a first intent corresponding to the original corpus recognized by an intent recognition model;

acquiring a second recognition result of each original corpus, wherein the second recognition result of any one of the original corpus includes a second intent corresponding to the original corpus obtained through artificial recognition; and;

performing optimization processing on the first intent set, according to the first recognition result and the second recognition result of each original corpus, to obtain a second intent set.

Further, the instructions are executed by the at least one processor to cause the at least one processor to implement following steps:

determining a first corpus number and a second corpus number corresponding to each intent in the first intent set according to the first recognition result and the second recognition result of each original corpus; and performing optimization processing on the first intent set to obtain a second intent set according to the first corpus number and the second corpus number corresponding to each intent in the first intent set; and where the determining a first corpus number and a second corpus number corresponding to each intent in the first intent set, includes:

determining, according to the first recognition result of each of the original corpus, the number of original corpus that the first intent thereof is the one of the first intent set as the first corpus number; and determining, according to the second recognition result of each of the original corpus that the first intent thereof is the one of the first intent set, the number of original corpus that the second intent thereof is the one of the first intent set as the second corpus number.

Further, the instructions are executed by the at least one processor to cause the at least one processor to implement following steps:

determining a first accuracy rate of the first intent set, according to the first corpus number and the second corpus number corresponding to each intent in the first intent set;

repeating following steps, until whether every two intents in the first intent set need to be merged is determined: determining, according to the first corpus number and the second corpus number corresponding to any two intents in the first intent set, a second accuracy rate corresponding to a third intent set obtained by merging the two intents, and determining that the two intents need to be merged when the second accuracy rate is higher than the first accuracy rate; and merging any two intents that need to be merged in the first intent set, to obtain the second intent set.

Further, the first accuracy rate is the ratio of a sum of the second corpus number corresponding to all intents in the first intent set to a sum of the first corpus number corresponding to all intents in the first intent set; and the second accuracy rate is the ratio of a sum of the second corpus number corresponding to all intents in the third intent set to a sum of the first corpus number corresponding to all intents in the third intent set.

Further, the instructions are executed by the at least one processor to cause the at least one processor to implement following steps:

determining a tagging value of each original corpus according to the first recognition result of each original corpus, and determine an original corpus that the tagging value thereof exceeds a set threshold as a valuable corpus, to obtain at least one valuable corpus; and acquiring the second recognition result of each valuable corpus.

Further, the first recognition result of each original corpus further includes an intent confidence of each intent in the first intent set corresponding to the original corpus; and the instructions are executed by the at least one processor to cause the at least one processor to implement following steps:

determining a confidence information entropy, a highest intent confidence and a secondary highest intent confidence corresponding to each original corpus according to the intent confidence of each intent in the first intent set corresponding to the original corpus; and determining a tagging value of each original corpus according to the confidence information entropy, the highest intent confidence and the secondary highest intent confidence corresponding to each original corpus.

Further, the instructions are executed by the at least one processor to cause the at least one processor to implement following steps:

determining that the second recognition result of an original corpus is the same tagging result as the first recognition result, if the second recognition result of the original corpus is not acquired.

Further, the instructions are executed by the at least one processor to cause the at least one processor to implement following steps:

training the intent recognition model according to the second recognition result of each original corpus.

Further, the instructions are executed by the at least one processor to cause the at least one processor to implement following steps:

selecting an intent from the second intent set to perform corpus tagging using the intent recognition model after the second intent set is obtained.

In a third aspect of the present application, a non-transitory computer readable storage medium storing computer instructions is provided, and the computer instructions are used to implement the method provided in any implementation of the first aspect.

One of the embodiments of aforementioned application has the following advantages or benefits: a reasonable classification granularity of the intent in the intent set, high intent recognition efficiency, and a good effect of the intent recognition. By adopting the technical means including: acquiring a first intent set and at least one original corpus; acquiring a first recognition result of each original corpus, where the first recognition result of any one of the original corpus includes a first intent corresponding to the original corpus recognized by an intent recognition model; acquiring a second recognition result of each original corpus, where the second recognition result of any one of the original corpus includes a second intent corresponding to the original corpus obtained through artificial recognition; and performing optimization processing on the first intent set to obtain a second intent set according to the first recognition result and the second recognition result of each original corpus, the problem of low intent recognition efficiency and unguaranteed accuracy due to the too fine or too vague intent classification granularity of the intent set in the intent recognition related technology is overcome.

Other effects of the aforementioned possible implementations will be described below in conjunction with specific embodiments.

BRIEF DESCRIPTION OF THE DRAWINGS

The accompanying drawings are for a better understanding of the present solution and are not intended to limit the application.

DESCRIPTION OF EMBODIMENTS

The following describes exemplary embodiments of the present application with reference to the accompanying drawings, which include various details of the embodiments of the present application to facilitate understanding, and should be regarded as merely exemplary. Therefore, those of ordinary skilled in the art should realize that various changes and modifications can be made to the embodiments described herein without departing from the scope and spirit of the present application. Likewise, for clarity and conciseness, descriptions of well-known functions and structures are omitted in the following description.

Application scenarios of this application: with rapid development of internet technologies, the automatic question and answering service has been widely promoted and applied, for example, in common areas such as e-commerce customer service, information query, self-service order processing, and search using engine search, automatic question and answer services are widely used. During the automatic question and answer service, the server obtains a corpus entered by a user, recognizes an intent and slot of the obtained corpus, and then returns the answer to the question matching the corpus or provides corresponding services, where intent recognition of the acquired corpus is one of the important contents thereof. In the process of intent recognition of the corpus, it is necessary to determine and provide an intent set in advance, so that an intent recognition model or an artificial tagger can select intents from the intent set for corpus tagging. In the prior art, after obtaining the intent set by learning the sample data, the fixed intent set obtained by learning is used for selecting the intent therein by the intent recognition model or the artificial tagger to perform the corpus tagging.

However, when the classification granularity of the intent set obtained by learning is too fine or too vague, the recognition efficiency and the accuracy rate of the corpus intent recognition would be significantly affected, which in turn affects the rate and the accuracy of the corpus tagging.

The intent recognition optimization processing method, the apparatus, the device, and the storage medium provided in this application are intended to solve the above technical problems.

Figure 1:
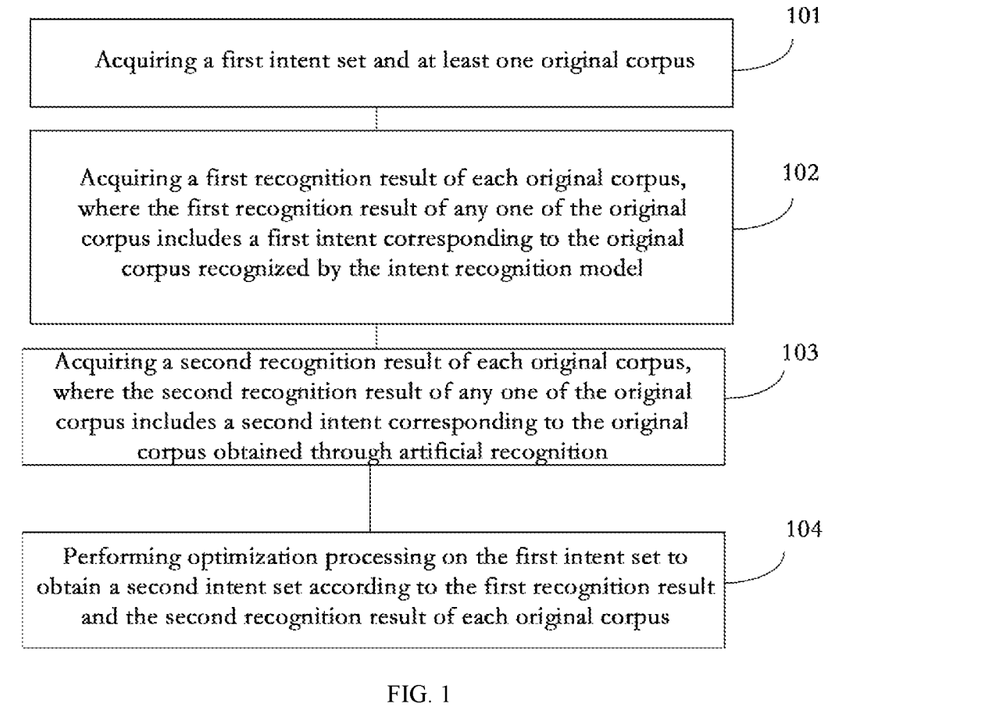
FIG. 1 is a schematic flowchart of an intent recognition optimization processing method provided by an embodiment of the present application.

FIG. 1 is an intent recognition optimization processing method provided by an embodiment of the present application. As shown in the FIG. 1, the method includes:

Step 101, acquiring a first intent set and at least one original corpus.

In this embodiment, specifically, the execution entity of this embodiment is a terminal device or a server or a controller provided on the terminal device, or other apparatuses or devices that can execute this embodiment. In this embodiment, the execution entity is the application software set on the terminal device as an example for description.

The first intent set obtained is the original intent set before optimization, including at least one category of intent. The function of the first intent set is for intent recognition model or artificial tagger to select intents for corpus tagging. The first intent set used in different application scenarios for corpus intent recognition is different. Exemplarily, in the e-commerce customer service, the first set of intents used in corpus intent recognition includes intents of purchase, product information consultation, product orientation selection, preferential consultation, etc. In fitness self-service, the first intent set used in corpus intent recognition includes intents of basic information, consulting coach, consulting address, general greeting, consulting registration, etc., and the first intent set used in different application scenarios is different.

The at least one original corpus acquired may be an untagged original corpus, or a corpus that has been tagged using an intent recognition model, in which case the first recognition result that has been tagged using the intent recognition model is included. Specifically, the corpus tagged with the intent recognition model in the working process of the automatic question-answering service can be selected, and the first intent set and the intent recognition model can be optimized by obtaining historical data in the working process of the automatic question answering service.

Step 102, acquiring a first recognition result of each original corpus, where the first recognition result of any one of the original corpus includes a first intent corresponding to the original corpus recognized by an intent recognition model.

In this embodiment, specifically, when the acquired original corpus is an untagged corpus, the intent recognition model is used to perform intent recognition and tagging each unlabeled original corpus to obtain the first recognition result tagged with the intent recognition model. When the acquired original corpus is a tagged corpus, the first recognition result of each tagged original corpus is directly obtained. The first recognition result of any one of the original corpus includes the first intent corresponding to the original corpus recognized by the intent recognition model, that is, the first recognition result is the model recognition result, and the first intent is the predictive intent of the original corpus. The first recognition result of any one of the original corpus includes not only the first intent corresponding to the original corpus recognized by the intent recognition model, but also the intent confidence of the original corpus corresponding to each intent in the first intent set. The method for determining the intent confidence can be implemented by using the existing technology, which will not be repeated in this application.

Step 103, acquiring a second recognition result of each original corpus, where the second recognition result of any one of the original corpus includes a second intent corresponding to the original corpus obtained through artificial recognition.

In this embodiment, specifically, in the optimization processing of the first intent set or the intent recognition model, the objective intent corresponding to each original corpus needs to be used, where the objective intent corresponding to each original corpus is an intent recognized artificially. The second recognition result of each original corpus is acquired through intent recognition and corpus tagging each original corpus by artificial tagger. The second recognition result of any one of the original corpus includes the second intent corresponding to the original corpus obtained through artificial recognition, that is, the second recognition result is an artificial recognition result, and the second intent is an objective intent.

When acquiring the second recognition result of each original corpus, the first intent set is displayed to the artificial tagger for the artificial tagger to select the intent in the first intent set for corpus tagging, which can effectively reduce the professional requirements of corpus tagging and at the same time help improve the efficiency of corpus tagging. When the acquired original corpus is an already tagged corpus, the first recognition result of each original corpus is displayed to the artificial tagger for the artificial tagger to judge the tagging result. When the artificial tagger agrees to the first recognition result of a certain original corpus, the original corpus can be skipped directly, and at this time, it is assumed that the second recognition result of the original corpus is the same as the first recognition result, which can effectively improve the efficiency of artificial tagging of the original corpus, thereby effectively improving the optimization efficiency of the first intent set, and conducive to improving the optimization efficiency of the intent recognition model.

Step 104, performing optimization processing on the first intent set to obtain a second intent set according to the first recognition result and the second recognition result of each original corpus.

In this embodiment, specifically, optimizing the first intent set, according to the first recognition result and the second recognition result of each original corpus, that is, according to the model recognition result and artificial recognition result of each original corpus. Since the second recognition result is the second intent corresponding to the artificially recognized original corpus, that is, the objective intent of the original corpus, according to the objective intent and predictive intent of each original corpus, the correct recognition result and the deviation recognition result corresponding to each of the intent in the first intent set can be determined. The correct recognition result is the number of original corpus of which the objective intent and the predictive intent are the same, and the deviation recognition result is the number of original corpus of which the objective intent is different from the predictive intent. Thus whether the classification of intent in the first intent set is reasonable can be determined, and the second intent set is obtained by optimizing the first intent set.

After obtaining the second intent set, performing corpus tagging to other corpora to realize automatic question-answer services by using the intent recognition model to select intents in the second intent set; also could be performing other optimization work by corpus tagging an intent selected in the second intent set for corpus tagging by artificial tagger. Since the second intent set is an optimized intent set, using the second intent set to perform intent recognition processing of the corpus realizes the optimization of corpus intent recognition.

In this embodiment, the second intent set is obtained by means of: acquiring a first intent set and at least one original corpus; acquiring a first recognition result of each original corpus, where the first recognition result of any one of the original corpus includes a first intent corresponding to the original corpus recognized by an intent recognition model; acquiring a second recognition result of each original corpus, where the second recognition result of any one of the original corpus includes a second intent corresponding to the original corpus obtained through artificial recognition; and performing optimization processing on the first intent set according to the first recognition result and the second recognition result of each original corpus. The optimization of the first intent set is performed according to the first recognition result and the second recognition result of each original corpus, i.e., according to the model recognition result and manual recognition result of each original corpus, where the method of optimizing an intent set is simple, and the optimization reference factors are diversified, and thus it is beneficial to realize effective intent set optimization, and then, it is beneficial to improve the recognition accuracy and efficiency of intent recognition by optimizing the intent set.

Figure 2:
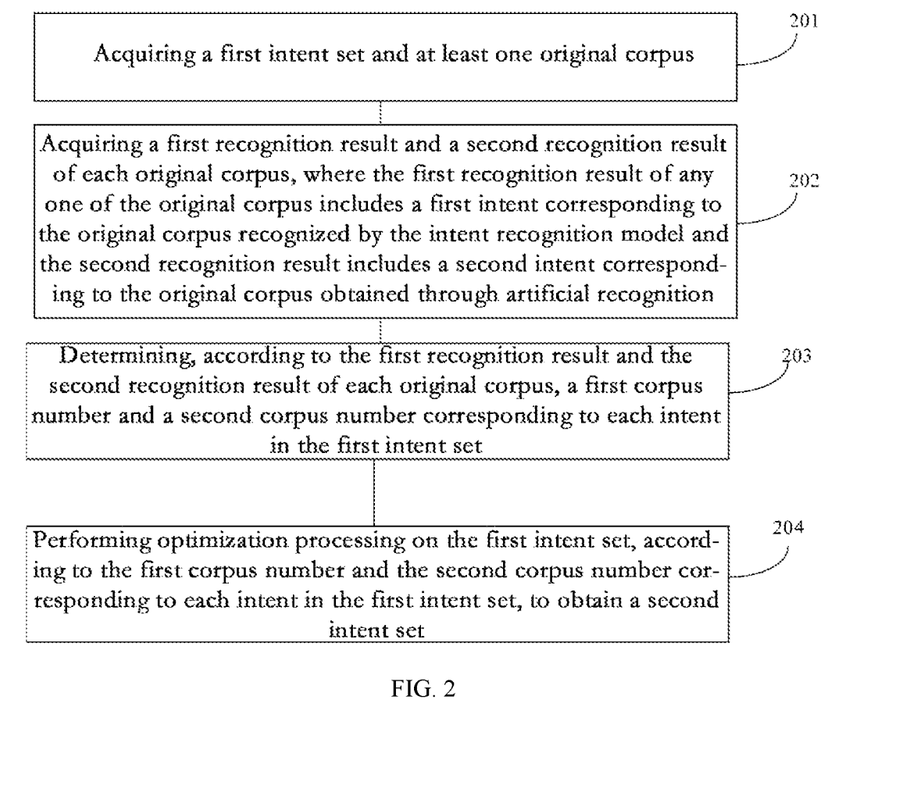
FIG. 2 is a schematic flowchart of another intent recognition optimization processing method provided by an embodiment of the present application.

FIG. 2 is a schematic flowchart of another intent recognition optimization processing method provided by an embodiment of the present application. As shown in the FIG. 2, the method includes:

Step 201, acquiring a first intent set and at least one original corpus.

In this embodiment, specifically, for this step, reference may be made to step 101 in FIG. 1, and details are not described herein again.

Step 202, acquiring a first recognition result and a second recognition result of each original corpus, where the first recognition result of any one of the original corpus includes a first intent corresponding to the original corpus recognized by the intent recognition model and the second recognition result includes a second intent corresponding to the original corpus obtained through artificial recognition.

In this embodiment, specifically, before acquiring the second recognition result of each original corpus, in order to improve the optimization efficiency of intent recognition optimization and reduce the workload of artificial tagger, determine a tagging value of each original corpus according to the first recognition result of each original corpus, and obtain the valuable corpus by filtering the acquired original corpus according to the tagging value of each original corpus, display the obtained valuable corpus to the artificial tagger, and obtain the second recognition result of the valuable corpus of the artificial tagger.

Determining the confidence information entropy, the highest intent confidence and the second highest intent confidence of the original corpus according to the intent confidence of each of the intent in the first intent set corresponding to any one of the original corpus. A greater confidence information entropy represents that the intent confidence of each intent in the first intent set corresponding to the original corpus is more average, which indicates that the uncertainty of the predictive intent of the original corpus is higher, and thus the tagging value of the original corpus is higher. A greater highest intent confidence represents that the original corpus is more concentrated to a certain intent, and thus the uncertainty of the predictive intent is lower, and the tagging value is lower; a larger confidence difference between the highest intent confidence and the second highest intent confidence represents that the original corpus is more concentrated to a certain intent, and thus the uncertainty of the predictive intent is lower, and the tagging value is lower.

Using characters s, m, d to respectively represent the confidence information entropy, the highest intent confidence, and the difference between the highest intent confidence and the second highest intent confidence of any original corpus, and normalize s, m, d respectively, and then the tagging value of the original corpus is determined as $v=(1-s+m+d)/3$. Take the original corpus that the tagging value thereof exceeds a set threshold as the valuable corpus, obtain the second recognition result of the valuable corpus and perform optimization processing on the first intent set according to the first recognition result and the second recognition result of the valuable corpus, according to which, the workload of the artificial tagger can be effectively reduced without affecting the optimization effect of the intent set, and the optimization efficiency of the intent set can be improved. The second recognition result of the valuable corpus can also be used to retrain the intent recognition model to optimize the intent recognition model, which has a high efficiency and a significant optimization effect.

After determining the tagging value of each original corpus, classify and mark the original corpus according to preset division thresholds, and send the original corpus with the classification mark to the artificial tagger for corpus tagging according to the classification mark, where the artificial tagger can determine whether to pay extra attention or quickly browse for tagging according to the classification mark. When the artificial tagger is faced with a large amount of original corpuses, the classification mark is conducive to helping the artificial tagger to quickly learn the value of each original corpus, and thus can help the artificial tagger adjust the tagging speed and unit tagging time according to the tagging value, which can effectively improve the efficiency of obtaining the second recognition result of the original corpus. Exemplarily, use a red mark to identify the original corpus that the tagging value thereof is higher than the first set threshold; use a green mark to identify the original corpus that the tagging value thereof is lower than the second set threshold; and use a yellow mark to identify the original corpus that the tagging value thereof is higher than the first set threshold and lower than the second set threshold. It can be used for artificial tagger to intuitively and quickly learn the value of each original corpus based on the mark in color of the original corpus. When the second recognition result of the original corpus is obtained, the artificial tagger can be prompted to focus on tagging the original corpuses with mark in red or mark in yellow.

Step 203, determining, according to the first recognition result and the second recognition result of each original corpus, a first corpus number and a second corpus number corresponding to each intent in the first intent set.

In this embodiment, specifically, when using the intent recognition model to recognize the original corpus, the intent recognition model selects one of the intents from the first intent set as the first intent (that is, the predictive intent) of the original corpus, and when using the artificial tagger to recognize the original corpus, the artificial tagger also selects one of the intents from the first intent set as the second intent (that is, the objective intent) of the original corpus. Therefore, for the acquired at least one original corpus, the set of first intent of the at least one original corpus is a subset of the first intent set, and the set of second intent set is also a subset of the first intent set.

Determining the first corpus number and the second corpus number corresponding to any intent in the first intent set, includes: determining, according to the first recognition result of each of the original corpus, the number of the original corpus that the first intent thereof is the one of the original corpus as the first corpus number; determining, according to the second recognition result of each of the original corpus that the first intent thereof is the one of the first intent set, the number of original corpus that the second intent thereof is the one of the first intent set as the second corpus number. For any original corpus, when the model recognition result of the original corpus is the same as the artificial recognition result, that is, when the predictive intent of the original corpus is the same as the objective intent, it is determined that the model recognition result of the original corpus is correct. Determine the first corpus number of any intent in the first intent set, where the first corpus number is the number of original corpus that the first intent thereof is the one in the said intent, determine, according to the second recognition result of each of the original corpus that the first intent thereof is the said intent, the number of original corpus that the second intent thereof is the said intent as the second corpus number. When the ratio of the second corpus number to the first corpus number corresponding to an intent is higher, the accuracy of intent recognition for the intent is higher and the intent recognition effect corresponding to the intent is better.

Step 204, performing optimization processing on the first intent set, according to the first corpus number and the second corpus number corresponding to each intent in the first intent set, to obtain a second intent set.

In this embodiment, specifically, the first intent set includes at least one intent, and the granularity of intent classification, which is too fine or too vague, will affect the recognition efficiency and recognition accuracy of the intent recognition. Therefore, it is necessary to determine whether to optimize the intent set and how to optimize the intent set according to the accuracy of the intent set.

Determining a first accuracy rate of the first intent set, according to the first corpus number and the second corpus number corresponding to each intent in the first intent set; repeating following steps, until whether every two intents in the first intent set need to be merged is determined: determining, according to the first corpus number and the second corpus number corresponding to any two intents in the first intent set, a second accuracy rate corresponding to a third intent set obtained by merging the two intents, and determining that the two intents need to be merged when the second accuracy rate is higher than the first accuracy rate; merging any two intents that need to be merged in the first intent set, to obtain the second intent set. The first accuracy rate is a ratio of a sum of the second corpus number corresponding to all intents in the first intent set to a sum of the first corpus number corresponding to all intents in the first intent set; and the second accuracy rate is the ratio of a sum of the second corpus number corresponding to all intents in the third intent set to a sum of the first corpus number corresponding to all intents in the third intent set.

Figure 2A:
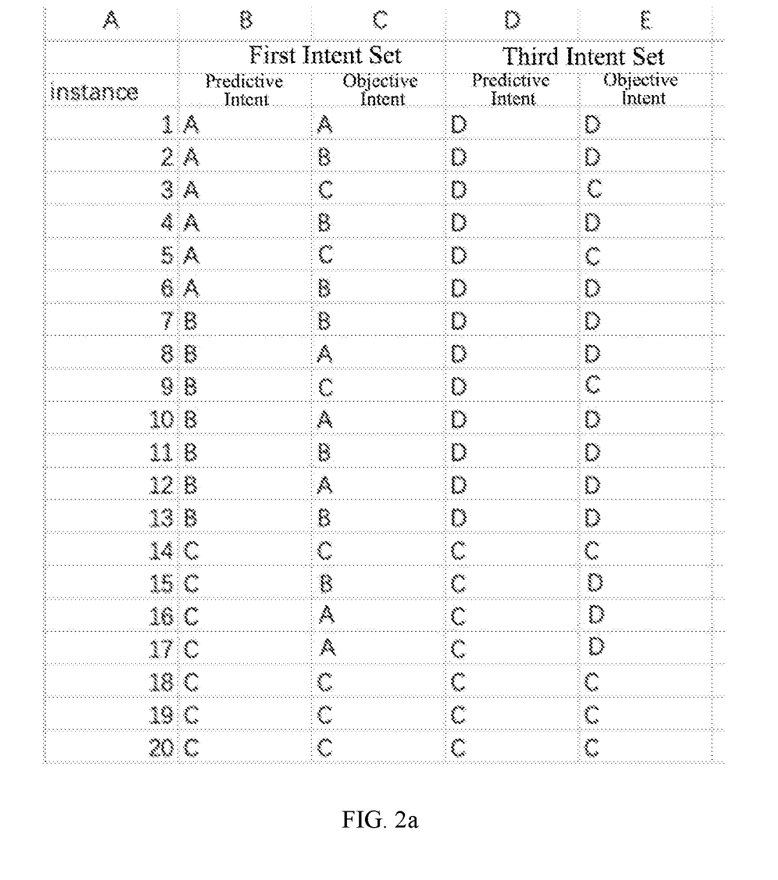
FIG. 2a is a schematic diagram of an intent merging according to an embodiment of the present application.

FIG. 2a is a schematic diagram of an intent merging according to an embodiment of the present application. The first corpus number corresponding to intent A, intent B, and intent C in the first intent set are 6, 7, and 7, respectively. The second corpus number corresponding to intent A, intent B, and intent C in the first intent set are 1, 3, and 4, respectively. The first accuracy rate of the first intent set is 0.4. Assuming that intent A and intent B are merged to obtain intent D. The first corpus number of the merged third intent set is 13, 7, respectively. The second corpus number is 10, 4, respectively, and the second accuracy rate of the third intent set is 0.7. The second accuracy rate is higher than the first accuracy rate, indicating that the design of the intent classification in the third intent set is more reasonable, and the intent classification of the first intent set needs to be merged. This example is an illustrative description of the first intent set. When the number of intents in the first intent set is too much and the granularity of intent classification is too fine, for example, in the automatic question-answering service about hotel orders, there are as many as dozens of intents in a common intent set, using the intent recognition model to select intents in the first intent set with unreasonable classification and very fine classification for corpus intent recognition has the disadvantages that the efficiency of intent recognition is low and the recognition accuracy is affected. Use the method of this embodiment to simplify the number of intents and the classification of intents in a concentration of intents on the basis of ensuring the accuracy of intent recognition, which can effectively improve the recognition efficiency of intent recognition and is beneficial to realize more efficient and intelligent automated services.

After completing the optimization processing for the first intent set, use the optimized second intent set to participate in the intent recognition of the corpus which is specifically used for the intent recognition model or manual annotators to select intents from the second intent set for intent recognition and corpus annotation.

In a possible implementation, use the second recognition result of the original corpus to retrain the intent recognition model to optimize the intent recognition model, that is, use the objective intent of the original corpus to train the intent recognition model to obtain an intent recognition model with better performance and higher recognition accuracy. The method of using the second recognition result of the original corpus to train the intent recognition model can be implemented by using existing technology, which will not be repeated in this application.

In this embodiment, acquire a first intent set and at least one original corpus; acquire a first recognition result and a second recognition result of each original corpus, where the first recognition result of any one of the original corpus includes a first intent corresponding to the original corpus recognized by the intent recognition model and the second recognition result includes a second intent corresponding to the original corpus obtained through artificial recognition; determine, according to the first recognition result and the second recognition result of each original corpus, a first corpus number and a second corpus number corresponding to each intent in the first intent set; and perform optimization processing on the first intent set, according to the first corpus number and the second corpus number corresponding to each intent in the first intent set, to obtain a second intent set. According to the first corpus number and the second corpus number corresponding to each of the intent in the first intent set, merge any two intents in the first intent set, and judge whether the accuracy of the intent set before and after the merge is improved. When the accuracy rate increases, it means that the two intents are poorly distinguishable, and their corresponding original corpus is less different, and thus the answers to questions or services provided according to the two intents can't specifically address different needs of users. There is a problem that the intent classification is too fine or too vague for the two intents, so it is necessary to merge the two intents. Obviously, after determining whether any two intents in the first intent set need to be merged, and after merging the intents that need to be merged, an intent set with optimized intent classification can be obtained. The number of intents in the optimized intent set can be effectively simplified, which is conducive to improving the recognition efficiency and recognition accuracy of intent recognition, and is conducive to improving the service effect of the automatic question-answering service. The intent set optimization method is simple. When automatic question-answering service products is provided to service providers, service providers can optimize the intent set and intent recognition model by using artificial corpus tagging. The method for optimizing automatic question-answering service product is simple and the optimization efficiency is high.

Figure 3:
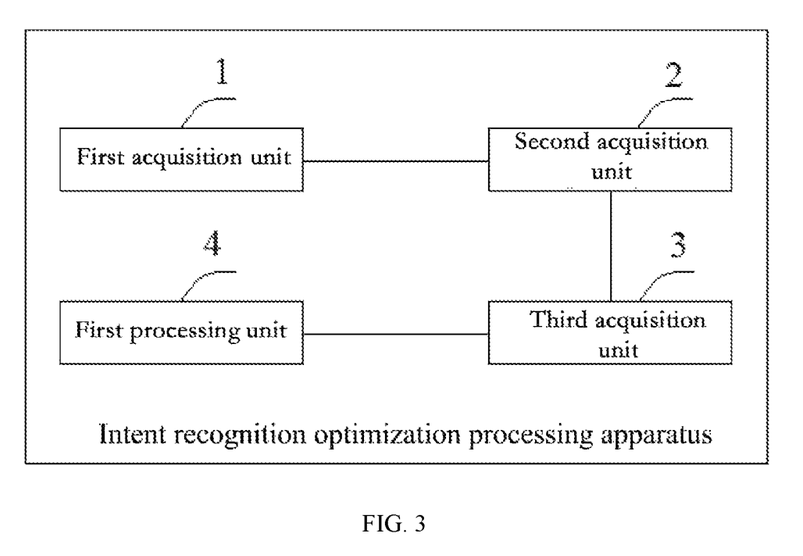
FIG. 3 is a schematic structural diagram of an intent recognition optimization processing apparatus according to an embodiment of the present application.

FIG. 3 is a schematic structural diagram of an intent recognition optimization processing apparatus according to an embodiment of the present application. As shown in the FIG. 3, the apparatus includes:
  a first acquisition unit 1, configured to acquire a first intent set and at least one original corpus;
  a second acquisition unit 2, configured to acquire a first recognition result of each original corpus, where the first recognition result of any one of the original corpus includes a first intent corresponding to the original corpus recognized by the intent recognition model;
  a third acquisition unit 3, configured to acquire a second recognition result of each original corpus, where the second recognition result of any one of the original corpus includes a second intent corresponding to the original corpus obtained through artificial recognition;
  a first processing unit 4, configured to perform optimization processing on the first intent set, according to the first recognition result and the second recognition result of each original corpus, to obtain a second intent set.

In this embodiment, the second intent set is obtained by means of: acquiring a first intent set and at least one original corpus; acquiring a first recognition result of each original corpus, where the first recognition result of any one of the original corpus includes a first intent corresponding to the original corpus recognized by an intent recognition model; acquiring a second recognition result of each original corpus, where the second recognition result of any one of the original corpus includes a second intent corresponding to the original corpus obtained through artificial recognition; and performing optimization processing on the first intent set according to the first recognition result and the second recognition result of each original corpus. The optimization of the first intent set is performed according to the first recognition result and the second recognition result of each original corpus, i.e., according to the model recognition result and manual recognition result of each original corpus, where the method of optimizing an intent set is simple, and the optimization reference factors are diversified, and thus it is beneficial to realize effective intent set optimization, and then, it is beneficial to improve the recognition accuracy and efficiency of intent recognition by optimizing the intent set.

Figure 4:
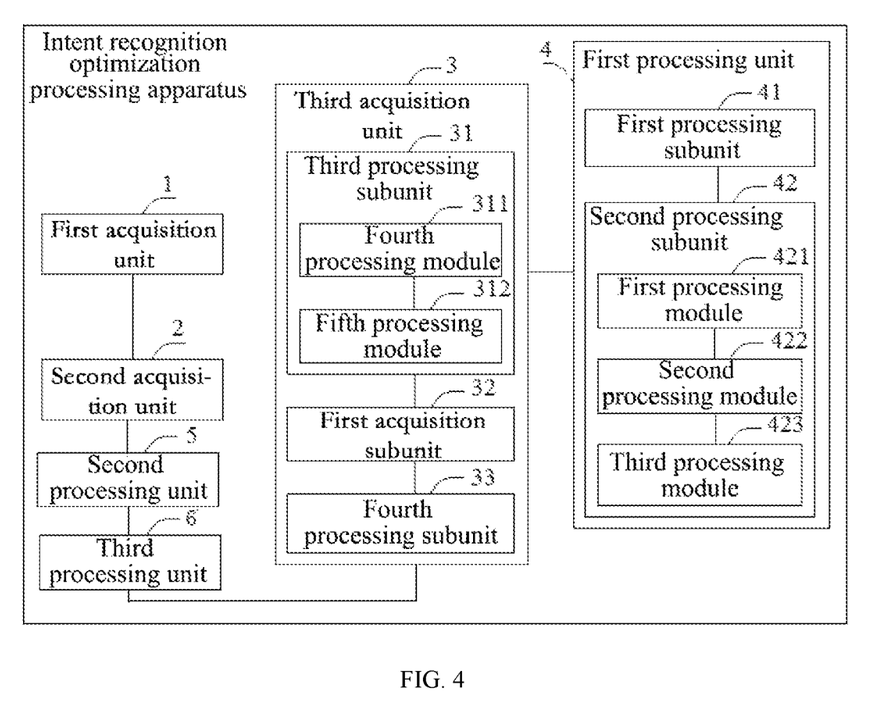
FIG. 4 is a schematic structural diagram of another intent recognition optimization processing apparatus according to an embodiment of the present application.

FIG. 4 is a schematic structural diagram of another intent recognition optimization processing apparatus according to an embodiment of the present application. On the basis of FIG. 3, as shown in FIG. 4,
  the first processing unit 4, including:
  a first processing subunit 41, configured to determine a first corpus number and a second corpus number corresponding to each intent in the first intent set according to the first recognition result and the second recognition result of each original corpus; and
  a second processing subunit 42, configured to perform optimization processing on the first intent set to obtain a second intent set according to the first corpus number and the second corpus number corresponding to each intent in the first intent set; and
  the determining the first corpus number and the second corpus number corresponding to any intent in the first intent set, includes:
  determining, according to the first recognition result of each of the original corpus, the number of the original corpus that the first intent thereof is the one of the first intent set as the first corpus number; and
  determining, according to the second recognition result of each of the original corpus that the first intent thereof is the one of the first intent set, the number of original corpus that the second intent thereof is the one of the first intent set as the second corpus number.

The second processing subunit 42 includes:
  a first processing module 421, configured to determine a first accuracy rate of the first intent set, according to the first corpus number and the second corpus number corresponding to each intent in the first intent set;
  a second processing module 422, configured to repeat following steps, until whether every two intents in the first intent set need to be merged is determined: determining, according to the first corpus number and the second corpus number corresponding to any two intents in the first intent set, a second accuracy rate corresponding to a third intent set obtained by merging the two intents, and determining that the two intents need to be merged when the second accuracy rate is higher than the first accuracy rate; and
  a third processing module 423, configured to merge any two intents that need to be merged in the first intent set, to obtain the second intent set.

The first accuracy rate is a ratio of a sum of the second corpus number corresponding to all intents in the first intent set to a sum of the first corpus number corresponding to all intents in the first intent set; and the second accuracy rate is the ratio of a sum of the second corpus number corresponding to all intents in the third intent set to a sum of the first corpus number corresponding to all intents in the third intent set.

The third acquisition unit 3 includes:

a third processing subunit 31, configured to determine a tagging value of each original corpus according to the first recognition result of each original corpus, and determine an original corpus that the tagging value thereof exceeds a set threshold as a valuable corpus, to obtain at least one valuable corpus; and a first acquisition subunit 32, configured to acquire the second recognition result of each valuable corpus.

The first recognition result of each original corpus further includes an intent confidence of each intent in the first intent set corresponding to the original corpus; and the third processing subunit 31 includes:

a fourth processing module 311, configured to determine a confidence information entropy, a highest intent confidence and a secondary highest intent confidence corresponding to each original corpus according to the intent confidence of each intent in the first intent set corresponding to the original corpus; and a fifth processing module 312, configured to determine a tagging value of each original corpus according to the confidence information entropy, the highest intent confidence and the secondary highest intent confidence corresponding to each original corpus.

The third acquisition unit 3 further includes:

a fourth processing subunit 33, configured to determine that the second recognition result of an original corpus is the same tagging result as the first recognition result, if the second recognition result of the original corpus is not acquired.

The apparatus further includes:

a second processing module 5, configured to train the intent recognition model according to the second recognition result of each original corpus.

the apparatus further includes:

a third processing module 6, configured to select an intent from the second intent set optimized by intent recognition to perform corpus tagging using the intent recognition model after the second intent set is obtained.

In this embodiment, acquire a first intent set and at least one original corpus; acquire a first recognition result and a second recognition result of each original corpus, where the first recognition result of any one of the original corpus includes a first intent corresponding to the original corpus recognized by the intent recognition model and the second recognition result includes a second intent corresponding to the original corpus obtained through artificial recognition; determine, according to the first recognition result and the second recognition result of each original corpus, a first corpus number and a second corpus number corresponding to each intent in the first intent set; and perform optimization processing on the first intent set, according to the first corpus number and the second corpus number corresponding to each intent in the first intent set, to obtain a second intent set. According to the first corpus number and the second corpus number corresponding to each of the intent in the first intent set, merge any two intents in the first intent set, and judge whether the accuracy of the intent set before and after the merge is improved. When the accuracy rate increases, it means that the two intents are poorly distinguishable, and their corresponding original corpus is less different, and thus the answers to questions or services provided according to the two intents can't specifically address different needs of users. There is a problem that the intent classification is too fine or too vague for the two intents, so it is necessary to merge the two intents. Obviously, after determining whether any two intents in the first intent set need to be merged, and after merging the intents that need to be merged, an intent set with optimized intent classification can be obtained. The number of intents in the optimized intent set can be effectively simplified, which is conducive to improving the recognition efficiency and recognition accuracy of intent recognition, and is conducive to improving the service effect of the automatic question-answering service. The intent set optimization method is simple. When automatic question-answering service products is provided to service providers, service providers can optimize the intent set and intent recognition model by using artificial corpus tagging. The method for optimizing automatic question-answering service product is simple and the optimization efficiency is high.

According to the embodiments of the present application, the present application also provides an electronic device and a readable storage medium.

Figure 5:
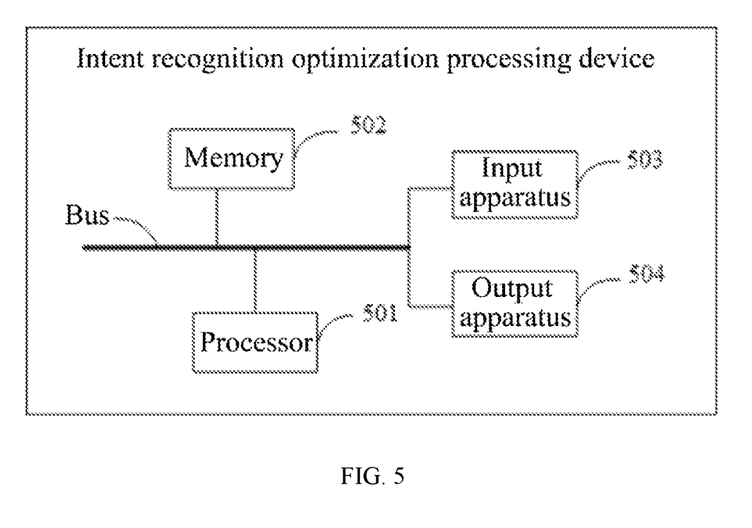
FIG. 5 is a schematic structural diagram of an intent recognition optimization processing apparatus according to an embodiment of the present application.

As shown in FIG. 5, it is a schematic structural diagram of an intent recognition optimization processing device according to intent recognition optimization an embodiment of the present application. Electronic devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital processing, cellular phones, smart phones, wearable devices, and other similar computing devices. The components shown herein, their connections and relationships, and their functions are merely examples, and are not intended to limit the implementation of the application described and/or required herein.

As shown in FIG. 5, the electronic device includes: one or more processors 501, memory 502, and interfaces for connecting various components, including a high-speed interface and a low-speed interface. The various components are connected to each other by using different buses, and can be installed on a common motherboard or installed in other ways as required. The processor may process instructions executed in the electronic device, including instructions stored in or on the memory to display graphical information of the GUI on an external input/output device (such as a display device coupled to an interface). In other embodiments, multiple processors and/or multiple buses may be used with multiple memories and multiple memories if necessary. Similarly, multiple electronic devices can be connected, and each device provides some necessary operations (for example, as a server array, a group of blade servers, or a multi-processor system). In FIG. 5, a processor 501 is taken as an example.

The memory 502 is a non-transitory computer-readable storage medium provided by this application. The memory stores instructions that can be executed by at least one processor, so that the at least one processor executes the intent recognition optimization processing method provided in this application. The non-transitory computer-readable storage medium of the present application stores computer instructions, and the computer instructions are used to make a computer execute the intent recognition optimization processing method provided by the present application.

As a non-transitory computer-readable storage medium, the memory 502 can be used to store non-transitory software programs, non-transitory computer executable programs, and modules, such as the program instructions/modules corresponding to the intent recognition optimization processing method in the embodiment of the application. (For example, the acquisition unit 1, the first processing unit 2 and the second processing unit 3 shown in FIG. 3) The processor 501 executes various functional applications and data processing of the server by running non-transitory software programs, instructions, and modules stored in the memory 502, that is, implementing the intent recognition optimization processing method in the foregoing method embodiment.

The memory 502 may include an area for storing program and an area for storing data, where the area for storing program can store an operating system and an application program required by at least one function; the storage data area may store data and the like created according to the use of electronic device for intent recognition optimization processing. In addition, the memory 502 may include a high-speed random access memory, and may also include a non-transitory memory, such as at least one magnetic disk storage component, a flash memory component, or other non-transitory solid-state storage components. In some embodiments, the memory 502 may optionally include a memory remotely provided with respect to the processor 501, and these remote memories may be connected to an electronic device for intent recognition optimization processing via a network. Examples of the aforementioned networks include, but are not limited to, the internet, corporate intranets, local area networks, mobile communication networks, and combinations thereof.

The electronic device of the intent recognition optimization processing method may further include: input apparatus 503 and output apparatus 504. The processor 501, the memory 502, the input apparatus 503, and the output apparatus 504 may be connected by a bus or other means. The bus connection is taken as an example in FIG. 5.

The input apparatus 503 can receive inputted number or character information, and generate key signal input related to user settings and function control of the electronic device for intent recognition optimization processing. For example, touch screen, keypad, mouse, track pad, touch pad, pointing stick, one or more mouse buttons, track ball, joystick and other input apparatus. The output device 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and technologies described herein can be implemented in digital electronic circuit systems, integrated circuit systems, application specific ASICs (application specific integrated circuits), computer hardware, firmware, software, and/or combinations thereof. These various implementations may include: implemented in one or more computer programs, the one or more computer programs may be executed and/or interpreted on a programmable system including at least one programmable processor, and the programmable processor may be a dedicated or general programmable processor, which can receive data and instructions from the storage system, at least one input apparatus, and at least one output apparatus, and transmit the data and instructions to the storage system, the at least one input apparatus, and the at least one output apparatus.

These computing programs (also called programs, software, software applications, or code) include machine instructions for programmable processors, and can use high-level process and/or object-oriented programming language, and/or assembly/machine language to implement these calculation programs. As used herein, the terms "machine-readable medium" and "computer-readable medium" refer to any computer program product, device, and/or apparatus used to provide machine instructions and/or data to a programmable processor (For example, magnetic disks, optical disks, memory, programmable logic devices (PLD)), including machine-readable media that receive machine instructions as machine-readable signals. The term "machine-readable signal" refers to any signal used to provide machine instructions and/or data to a programmable processor.

In order to provide interaction with users, the systems and techniques described here can be implemented on a computer that has: display apparatuses used to display information to users (for example, CRT (Cathode Ray Tube) or LCD (Liquid Crystal Display) monitors); as well as a keyboard and a pointing apparatus (for example, a mouse or a trackball), the user can provide input to the computer through the keyboard and the pointing apparatus. Other types of apparatuses can also be used to provide interaction with users; for example, the feedback provided to the user can be any form of sensory feedback (for example, visual feedback, auditory feedback, or tactile feedback); and can use any form (including sound input, voice input or tactile input) to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or web browser, through which the user can interact with the implementation of the system and technology described herein), or any combination of back-end components, middleware components, or front-end components in a computing system. The components of the system can be connected to each other through any form or medium of digital data communication (for example, a communication network). Examples of communication networks include: local area network (LAN), wide area network (WAN), and the Internet.

The computer system can include clients and servers. The client and server are generally far away from each other and usually interact through a communication network. The relationship between the client and the server is generated through computer programs running on the corresponding computers and having a client-server relationship with each other.

For the principles and beneficial effects of the intent recognition optimization processing system provided in this embodiment, refer to the principles and beneficial effects of the intent recognition optimization processing method in FIG. 1 to FIG. 2, and details are not repeated here.

For the principles and beneficial effects of the intent recognition optimization processing method provided in this embodiment, refer to the principles and beneficial effects of the intent recognition optimization processing method in FIG. 1 to FIG. 2, and details are not repeated here.

In the embodiments of the present application, the above-mentioned embodiments can refer to each other and learn from each other, and the same or similar steps and nouns will not be repeated.

It should be understood that the various forms of processes shown above can be used to reorder, add or delete steps. For example, the steps described in the present application can be performed in parallel, sequentially, or in a different order, as long as the desired result of the technical solution disclosed in the present application can be achieved, this is not limited herein.

The foregoing specific implementations do not constitute a limitation on the protection scope of the present application. Those skilled in the art should understand that various modifications, combinations, sub-combinations and substitutions can be made according to design requirements and other factors. Any modifications, equivalent replacements and improvements made within the spirit and principles of this application shall be included in the scope of protection of this application.

What is claimed is:

1. An intent recognition optimization processing method, implemented by a terminal device, the method comprising:
    acquiring a first intent set and at least one original corpus, the first intent set comprising at least one intent;
    recognizing, with an intent recognition model, a first intent corresponding to each original corpus from the first intent set, to acquire a first recognition result of the original corpus, wherein the first recognition result of any one of the original corpus comprises the first intent corresponding to the original corpus recognized by the intent recognition model;
    acquiring a second recognition result of each original corpus, wherein the second recognition result of any one of the original corpus includes a second intent corresponding to the original corpus recognized through manual tagging;
    performing optimization processing on the first intent set, according to the first recognition result and the second recognition result of each original corpus, to obtain a second intent set comprising at least one intent; and
    recognizing, with the intent recognition model, an intent of a corpus entered by a user, wherein the recognized intent of the entered corpus is selected from the optimized second intent set; and providing a search result matching the recognized intent, through engine search based on automatic question and answering service;
    wherein the first recognition result of each original corpus further comprises an intent confidence of each intent in the first intent set corresponding to the original corpus; and
    the acquiring the second recognition result of each original corpus comprises:
    determining, according to an intent confidence of each intent in the first intent set corresponding to the original corpus, a confidence information entropy, a highest intent confidence and a secondary highest intent confidence corresponding to each of the original corpus;
    determining, according to the confidence information entropy, the highest intent confidence and the secondary highest intent confidence corresponding to each of the original corpus, a tagging value of each of the original corpus;
    determining an original corpus that the tagging value thereof exceeds a set threshold as a valuable corpus, to obtain at least one valuable corpus; and
    acquiring the second recognition result of each valuable corpus;
    wherein the tagging value of the original corpus increases as the confidence information entropy increases, the tagging value of the original corpus decreases as the highest intent confidence increases, and the tagging value of the original corpus decreases as a difference between the highest intent confidence and the second highest intent confidence increases.

2. The method according to claim 1, wherein, the performing optimization processing on the first intent set, according to the first recognition result and the second recognition result of each original corpus, to obtain a second intent set, comprises:
    determining, according to the first recognition result and the second recognition result of each original corpus, a first corpus number and a second corpus number corresponding to each intent in the first intent set respectively; and
    performing optimization processing on the first intent set, according to the first corpus number and the second corpus number corresponding to each intent in the first intent set, to obtain a second intent set; and
    wherein the determining a first corpus number and a second corpus number corresponding to each intent in the first intent set, comprises performing following steps for each intent in the first intent set:
    determining, according to the first recognition result of each of the original corpus, the number of original corpus that the first intent thereof is the one of the first intent set as the first corpus number; and
    determining, according to the second recognition result of each of the original corpus that the first intent thereof is the one of the first intent set, the number of original corpus that the second intent thereof is the one of the first intent set as the second corpus number.

3. The method according to claim 2, wherein, the performing optimization processing on the first intent set, according to the first corpus number and the second corpus number corresponding to each intent in the first intent set, to obtain a second intent set, comprises:
    determining a first accuracy rate of the first intent set, according to the first corpus number and the second corpus number corresponding to each intent in the first intent set;
    repeating following steps, until whether every two intents in the first intent set need to be merged is determined:
    determining, according to the first corpus number and the second corpus number corresponding to any two intents in the first intent set, a second accuracy rate corresponding to a third intent set obtained by merging the two intents, and determining that the two intents need to be merged when the second accuracy rate is higher than the first accuracy rate; and
    merging any two intents that need to be merged in the first intent set, to obtain the second intent set.

4. The method according to claim 3, wherein, the first accuracy rate is a ratio of a sum of the second corpus number corresponding to all intents in the first intent set to a sum of the first corpus number corresponding to all intents in the first intent set; and the second accuracy rate is a ratio of a sum of the second corpus number corresponding to all intents in the third intent set to a sum of the first corpus number corresponding to all intents in the third intent set.

5. The method according to claim 1, wherein, the acquiring the second recognition result of each original corpus comprises:
    determining that the second recognition result of an original corpus is the same tagging result as the first recognition result, if the second recognition result of the original corpus is not acquired.

6. The method according to claim 1, wherein, the method further comprises: training the intent recognition model according to the second recognition result of each of the original corpus.

7. An intent recognition optimization processing apparatus, implemented in a terminal device, the apparatus comprising: at least one processor; and
a memory communicatively connected with the at least one processor, wherein:
the memory stores thereon instructions executable by the at least one processor, and the instructions are executed by the at least one processor to cause the at least one processor to implement following steps:
acquiring a first intent set and at least one original corpus, the first intent set comprising at least one intent;
recognizing, with an intent recognition model, a first intent corresponding to each original corpus from the first intent set, to acquire a first recognition result of the original corpus, wherein the first recognition result of any one of the original corpus comprises the first intent corresponding to the original corpus recognized by the intent recognition model;
acquiring a second recognition result of each original corpus, wherein the second recognition result of any one of the original corpus includes a second intent corresponding to the original corpus recognized through manual tagging;
performing optimization processing on the first intent set, according to the first recognition result and the second recognition result of each original corpus, to obtain a second intent set comprising at least one intent; and
recognizing, with the intent recognition model, an intent of a corpus entered by a user, wherein the recognized intent of the entered corpus is selected from the optimized second intent set; and providing a search result matching the recognized intent, through engine search based on automatic question and answering service;
wherein the first recognition result of each original corpus further comprises an intent confidence of each intent in the first intent set corresponding to the original corpus; and
the instructions further cause the at least one processor to implement following steps:
determining a confidence information entropy, a highest intent confidence and a secondary highest intent confidence corresponding to each original corpus according to the intent confidence of each intent in the first intent set corresponding to the original corpus; and
determining a tagging value of each of the original corpus according to the confidence information entropy, the highest intent confidence and the secondary highest intent confidence corresponding to each of the original corpus;
determining an original corpus that the tagging value thereof exceeds a set threshold as a valuable corpus, to obtain at least one valuable corpus; and
acquiring the second recognition result of each valuable corpus;
wherein the tagging value of the original corpus increases as the confidence information entropy increases, the tagging value of the original corpus decreases as the highest intent confidence increases, and the tagging value of the original corpus decreases as a difference between the highest intent confidence and the second highest intent confidence increases.

8. The apparatus according to claim 7, wherein the instructions cause the at least one processor to implement following steps:

determining a first corpus number and a second corpus number corresponding to each intent in the first intent set according to the first recognition result and the second recognition result of each original corpus; and
performing optimization processing on the first intent set to obtain a second intent set according to the first corpus number and the second corpus number corresponding to each intent in the first intent set; and
determining, according to the first recognition result of each of the original corpus, the number of original corpus that the first intent thereof is the one of the first intent set as the first corpus number; and
determining, according to the second recognition result of each of the original corpus that the first intent thereof is the one of the first intent set, the number of original corpus that the second intent thereof is the one of the first intent set as the second corpus number.

9. The apparatus according to claim 8, wherein the instructions cause the at least one processor to implement following steps:
determining a first accuracy rate of the first intent set, according to the first corpus number and the second corpus number corresponding to each intent in the first intent set;
repeating following steps, until whether every two intents in the first intent set need to be merged is determined: determining, according to the first corpus number and the second corpus number corresponding to any two intents in the first intent set, a second accuracy rate corresponding to a third intent set obtained by merging the two intents, and determining that the two intents need to be merged when the second accuracy rate is higher than the first accuracy rate; and
merging any two intents that need to be merged in the first intent set, to obtain the second intent set.

10. The apparatus according to claim 9, wherein, the first accuracy rate is a ratio of a sum of the second corpus number corresponding to all intents in the first intent set to a sum of the first corpus number corresponding to all intents in the first intent set; and the second accuracy rate is the ratio of a sum of the second corpus number corresponding to all intents in the third intent set to a sum of the first corpus number corresponding to all intents in the third intent set.

11. The apparatus according to claim 9, wherein, the instructions cause the at least one processor to implement following steps:
training the intent recognition model according to the second recognition result of each of the original corpus.

12. The apparatus according to claim 7, wherein, the instructions cause the at least one processor to implement following steps:
determining that the second recognition result of an original corpus is the same tagging result as the first recognition result, if the second recognition result of the original corpus is not acquired.

13. The apparatus according to claim 7, wherein, the instructions cause the at least one processor to implement following steps:
training the intent recognition model according to the second recognition result of each of the original corpus.

14. A non-transitory computer-readable storage medium storing computer instructions, wherein, the computer instructions are used to cause the computer to execute the method according to claim 1.

* * * * *